United States Patent [19]

Linamen et al.

[11] Patent Number: 4,951,617
[45] Date of Patent: Aug. 28, 1990

[54] ATTACHABLE INTAKE VALVE ASSEMBLY AND METHOD FOR USING SAME

[76] Inventors: Fred Linamen, 7685 SE. Wren Ave.; Wilbert Hofstrand, 7675 SE. Wren Ave., both of Hobe Sound, Fla. 33455

[21] Appl. No.: 411,401

[22] Filed: Sep. 22, 1989

[51] Int. Cl.$^5$ ............................................. F02M 35/10
[52] U.S. Cl. ................................ 123/52 MF; 137/855
[58] Field of Search ............. 123/52 MF, 65 P, 52 M; 137/855

[56] References Cited

U.S. PATENT DOCUMENTS

| | | |
|---|---|---|
| 1,271,181 | 7/1918 | Lenhart . |
| 1,292,613 | 1/1919 | Kessler . |
| 1,329,545 | 2/1920 | Plavsa . |
| 1,394,452 | 10/1921 | Taft ........................................ 261/16 |
| 1,640,291 | 8/1927 | Perkins . |
| 1,809,387 | 6/1931 | Melkman . |
| 2,169,564 | 8/1939 | Maher .................................. 165/160 |
| 3,147,320 | 9/1964 | Tubb . |
| 3,151,190 | 9/1964 | Kapitula . |
| 3,575,391 | 4/1971 | Braun et al. ......................... 261/64.1 |
| 3,810,454 | 5/1974 | Hunt .............................. 123/52 MF |
| 4,153,651 | 5/1979 | Mears, Jr. ............................. 261/55 |
| 4,191,149 | 3/1980 | Dutta et al. ..................... 123/119 EC |
| 4,283,355 | 8/1981 | Herd et al. ......................... 261/44 F |
| 4,336,783 | 6/1982 | Henson ................................ 123/557 |
| 4,422,416 | 12/1983 | Bernardoni ..................... 123/52 MF |
| 4,441,477 | 4/1984 | Holt ..................................... 123/557 |
| 4,488,519 | 12/1984 | Kishida .......................... 123/52 MF |
| 4,509,466 | 4/1985 | Bernardoni et al. .......... 123/52 MF |
| 4,682,576 | 7/1987 | Nakamura et al. ............ 123/52 MF |
| 4,796,584 | 1/1989 | Goto et al. ..................... 123/52 MF |

FOREIGN PATENT DOCUMENTS

| | | | |
|---|---|---|---|
| 421011 | 5/1947 | Italy ................................ 123/52 MF |
| 0160514 | 9/1983 | Japan ............................ 123/52 MF |

*Primary Examiner*—David A. Okonsky
*Attorney, Agent, or Firm*—Eckert Seamans Cherin & Mellott

[57] ABSTRACT

An attachable intake valve assembly is provided as an add-on device to improve the performance of internal combustion engines with poorly performing intake valves. The intake valve assembly includes a valve chamber having at least one inlet port, at least one outlet port, at least one flow passage between the inlet port and the outlet port, and at least one reed valve adapted to permit gas flow from the inlet port to the outlet port, and to prevent backflow from the outlet port to the inlet port. A method of improving the performance of internal combustion engines with poorly performing intake valves is also disclosed.

17 Claims, 3 Drawing Sheets

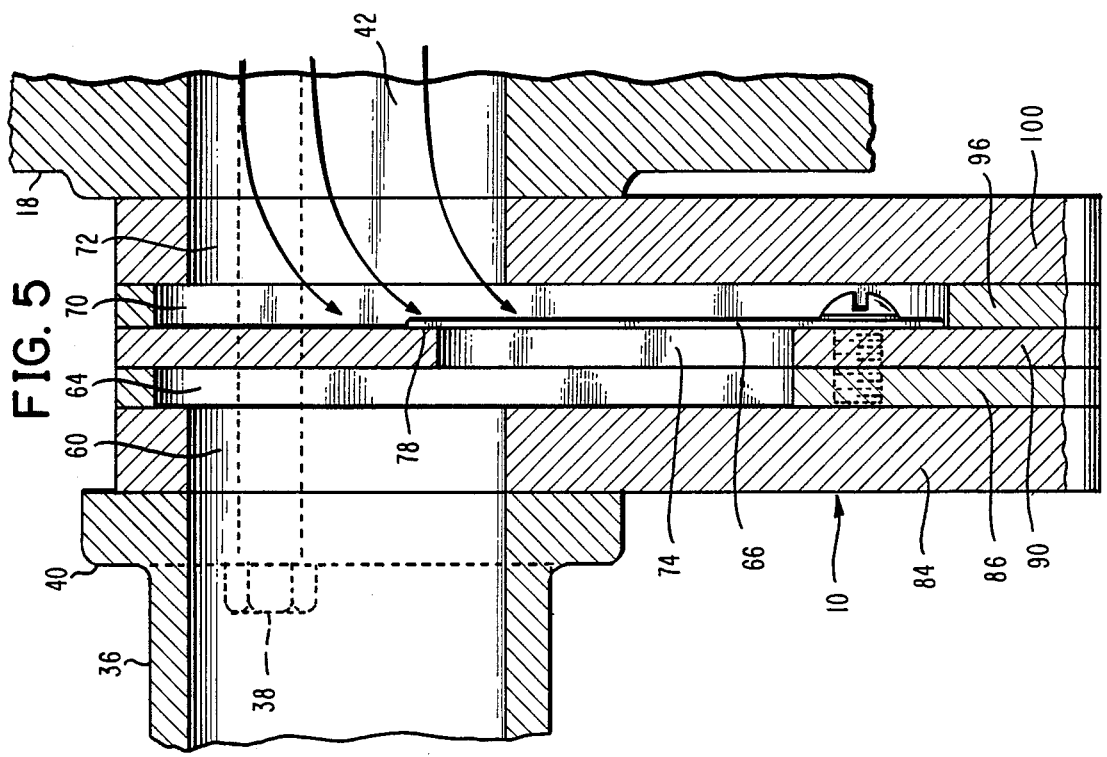
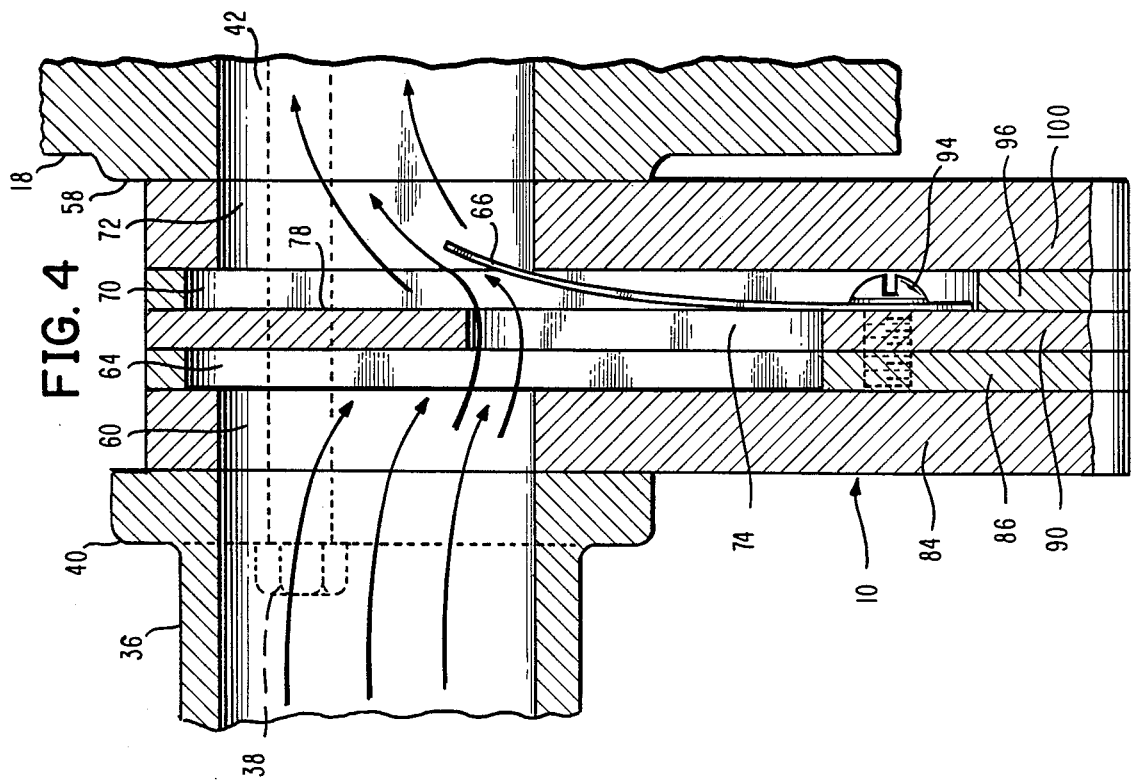

ATTACHABLE INTAKE VALVE ASSEMBLY AND METHOD FOR USING SAME

BACKGROUND OF THE INVENTION

1. Field of the Invention

This invention relates generally to internal combustion engines, and more particularly to apparatus for improving the performance of internal combustion engines with poorly performing intake valves.

2. Description of the Prior Art

Engine intake valves with use become pitted and charred with combustion products as the result of the extreme heat present inside the engine cylinder The intake valve in this instance will no longer seat properly, and may allow the backflow of gases through the intake port of the engine during the compression/combustion strokes. Correction of faulty valves typically requires the removal of the valve from the engine block for replacement or refurbishing. This is a time-consuming and expensive process, and for small engines the necessary expense can approach that required to replace the entire engine.

A number of inventions have been directed to the prevention of engine backflow through the carburetor of the engine. These devices will not, to any significant degree, correct the poor engine performance associated with a faulty intake valve. Further, these devices are complicated and costly to manufacture and install. This cost, again, becomes prohibitive for use with small engines, the value of which does not warrant the expense.

It would be desirable to provide an intake valve assembly which would improve poor engine performance associated with some intake valves. It would also be desirable that such a device be inexpensive to manufacture, such that the device would be economically feasible for use with small engines. It would also be desirable if such a device could be easily installed, either by the engine owner or by an engine mechanic with little special training. It would further be desirable to provide a device which could be readily adapted for use with many different engine styles and sizes.

SUMMARY OF THE INVENTION

It is an object of the invention to provide a device which will improve poor engine performance in internal combustion engines associated with an intake valve.

It is another object of the invention to provide such a device which will be inexpensive to manufacture.

It is yet another object of the invention to provide a device which can be easily installed in existing engines, and with little specialized tools or training.

It is still another object of the invention to provide a device which can be adapted for use with many different styles and sizes of engines.

These and other objects are accomplished by an intake valve assembly having a valve chamber with at least one inlet port, at least one outlet port, a flow passage between the inlet port and the outlet port, and at least one reed valve positioned in the flow passage and adapted to permit gas flow from the inlet port to the outlet port, and to substantially prevent gas flow from the outlet port to the inlet port. The valve chamber is preferably attached as near to the engine intake port as possible, and most preferably attached directly to the engine block, as between the engine intake flange and the intake manifold. Fuel gases will flow from the intake manifold through the inlet port and flow passage of the valve chamber, and out of the outlet port and into the engine intake port and the cylinder. Back pressure created during the compression/combustion strokes will be blocked from entering the intake manifold by the one-way reed valve in the valve chamber. Engine performance caused by the faulty valve will be improved, as the reed valve will function much in the place of the faulty intake valve owing to its position immediately adjacent the intake valve and the engine block.

The intake valve assembly of the invention can take on several alternative forms. It is preferable, for example, in larger horsepower engines to provide dual reed valves in a single valve chamber. These reed valves can be oriented in a "V" configuration to permit optimal flow from the inlet port, past the reed valves through the outlet port.

The valve chamber can be fashioned in a number of configurations corresponding to the space available on a particular style and size of engine. The reed valve construction of the invention has a relatively small width, and requires very little space. The width permits ready installation in most engines with only adjustments to the perimeter dimensions of the plate-like valve chamber to accommodate obstructions in a particular engine.

The invention could be manufactured from current manufacturing techniques including casting, molding, and machining. It is currently preferred to machine several different plates and to connect these plates to form the valve body. These plates include an inlet port plate, an inlet chamber plate, a reed valve plate, an outlet chamber plate, and an outlet port plate. The plates can be secured together by suitable means, and edges of the plates can be sealed by appropriate structure including gaskets and sealing compounds. Apertures can be formed in the plates for the reception of screws or bolts, which bolts will preferably align with the threaded openings already formed in the engine block adjacent the engine intake flange for the attachment of the intake manifold.

BRIEF DESCRIPTION OF THE DRAWINGS

There are shown in the drawings embodiments which are presently preferred, it being understood, however, that the invention is not limited to the precise arrangements and instrumentalities shown, wherein:

FIG. 4 is a cross-section taken along line A—A in FIG. 2, and in a first mode of operation.

FIG. 5 is a cross-section taken along line A—A in FIG. 2, and in a second mode of operation.

DETAILED DESCRIPTION OF THE PREFERRED EMBODIMENTS

Figure 1:
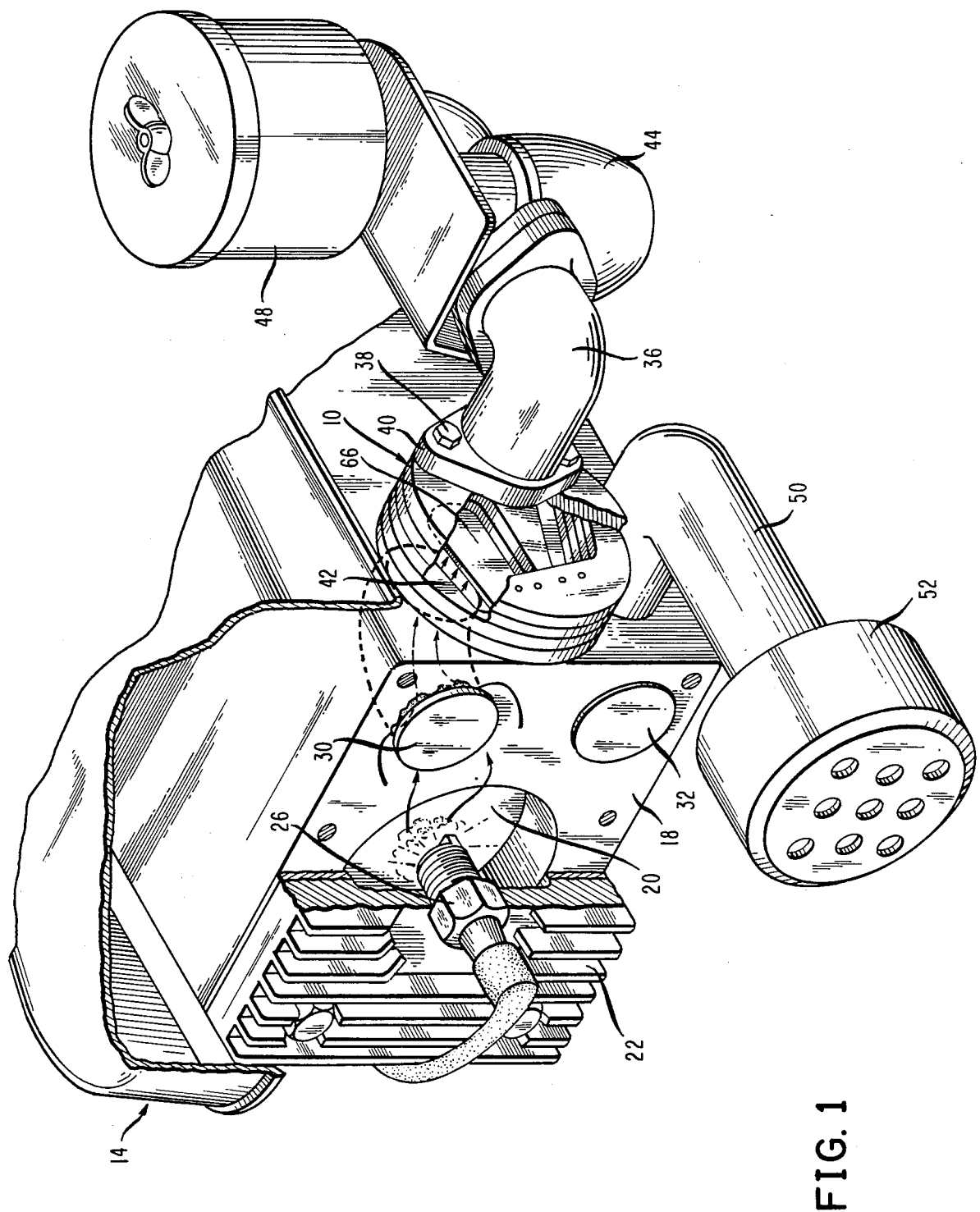
FIG. 1 is a perspective view, partially broken away, of the intake valve assembly of the invention as attached to an engine.

There is shown in FIG. 1 an intake valve assembly according to the invention with an intake valve chamber 10. The intake valve assembly is attached to a small engine 14. The engine 14 can be of several suitable styles and sizes, but will include an engine block 18 into which is fashioned at least one cylinder 20 that is covered by a cylinder head 22. A spark plug 26 will be mounted through the cylinder head 22 in many engine configurations. An intake valve 30 and exhaust valve 32 control the flow of gas into and out of the cylinder 20. Fuel gases typically reach the intake valve 30 from an intake manifold 36, which can be attached to the engine block 18 by bolts 38 that are positioned in apertures formed in an intake manifold flange 40. The intake manifold 36 communicates with an engine intake port 42 to conduct the gases to the intake valve 30. The intake manifold 36 is often fixed directly to the carburetor 44, which receives air from the atmosphere and may be associated with an air cleaner 48. Combustion products pass the exhaust valve 32 and exit the engine through an exhaust manifold 50 which is sometimes fitted with a muffler 52. The foregoing description is provided as exemplary of an engine with which the invention can be utilized, and it will be apparent to one skilled in the art that the principles disclosed herein would be equally applicable to other styles and sizes of internal combustion engines.

The intake valve chamber 10 is mounted as closely to the engine intake port 42 of the engine block 18 as is possible with the particular style of the engine at hand. In the present embodiment, the intake valve chamber 10 is mounted directly to an engine intake flange 58 of the engine block 18, although it would be appreciated that in other engine styles, it may not be possible to attach the intake valve assembly 10 directly to the engine block 18. It is preferable for any engine configuration to always mount the intake valve assembly 10 as near to the intake valve 30 in the intake gas flow path as is possible.

The intake valve chamber 10 includes at least one inlet port 60, an inlet chamber 64, a reed valve 66, an outlet chamber 70, and at least one outlet port 72. The reed valve 66 controls gas flow through the intake valve chamber 10, and preferably controls flow through a valve opening 74. The intake stroke of the piston within the engine cylinder 20 creates a negative pressure which moves the reed valve 66 from the valve seat 78. Combustion fuel gases can then flow from the inlet port 60, inlet chamber 64, through the valve opening 74, outlet chamber 70, and the outlet port 72 into the engine intake port 42, as shown schematically by the arrows in FIG. 4. The compression/combustion strokes of the cylinder will create a positive pressure at the outlet port 72 as combustion gases are forced past the faulty valve 30. This pressure will allow the reed valve 66, which is biased by its own spring tension to the closed position, to seat against the valve seat 78 as shown schematically by the arrows in FIG. 5.

The intake valve chamber 10 is positioned substantially adjacent to the intake valve 30, and the reed valve 66 will act to a large degree as a substitute for the intake valve 30, and will alternately open and close according to the demand created by operation of the engine. The flat reed valve allows for a relatively thin, plate-like assembly which can be installed very near to the engine intake port 42, so that the reed valve 66 will be as close to the intake valve 30 as possible, and will be more responsive to the operation of the engine. The performance of the engine will thereby be improved.

The intake valve chamber 10 can be constructed in many different configurations, to adapt to the style and size of the particular engine to which the assembly must be mounted. Obstructions of one sort or another may be present in a particular engine design, and the configuration of the valve assembly may be modified to suit this design.

The intake valve chamber 10 can be constructed by various suitable techniques, including casting, molding and machining. A preferred construction of the intake valve chamber 10 provides a series of plates which are juxtaposed and secured together. The plates have openings defining the various openings and spaces of the intake valve chamber 10. An inlet port plate 84, for example, will have an aperture defining the inlet port 60. An inlet chamber plate 86 includes a large diameter aperture defining the inlet chamber 64. A valve plate 90 has formed therein the valve openings 74. The reed valve 66 is attached to the valve plate 90 by suitable fastening structure such as the screw 94. An outlet chamber plate 96 has a large area aperture defining the inlet chamber 70. An outlet port plate 100 can have a small area opening defining the outlet port 72.

The plates can be secured together by the provision of fastening apertures 104 which align when the plates are juxtaposed as shown in FIG. 4. A bolt 38 can be positioned through the manifold flange 40, and further through the aligned apertures 104 in each of the inlet port plate 84, inlet chamber plate 86, valve plate 90, outlet chamber plate 96 and outlet port plate 100. The bolt 38 will then be secured directly to a suitable threaded opening in the engine block 18 to secure the assembly together, and to secure the intake manifold 36 to engine block 18. Suitable sealing structure such as gaskets and sealing compounds can be used to seal the areas of contact between the plates.

The configuration of the intake valve assembly 10 can be altered to provide for different flow characteristics and to suit different engine configurations. The size of the inlet and outlet ports, inlet and outlet chambers, and valve openings can be modified depending on the flow requirements of the engine.

Figure 2:
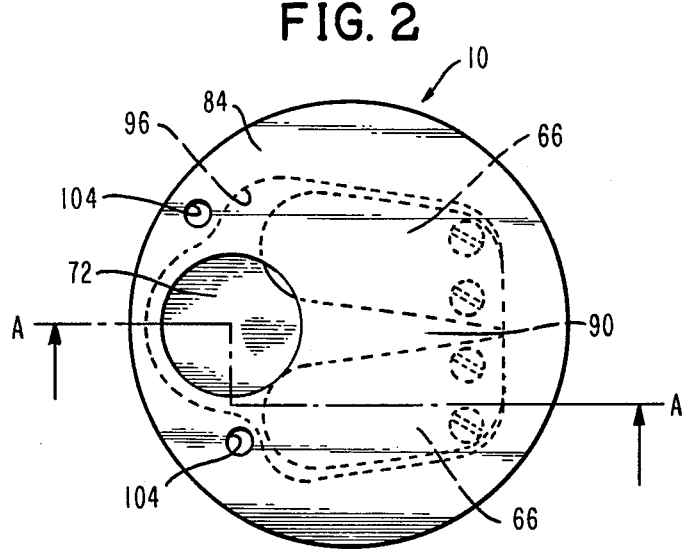
FIG. 2 is a plan view, partially in phantom, of the intake valve assembly.
Figure 3:
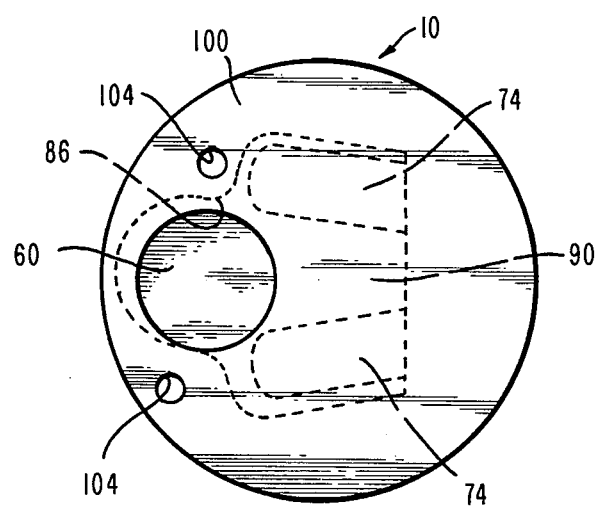
FIG. 3 is a bottom view, partially in phantom, of the intake valve assembly.

The reed valve is presently preferred because of its durability, responsiveness to demand by the engine, low cost, and thin dimensions which permit installation in many engine configurations without substantial engine modification. It would be apparent to one skilled in the art that other valve constructions could be utilized in an intake valve assembly according to the invention, although it is not presently believed that the same would be as suitable as the reed valve. More, or fewer, valves can be provided in a single valve chamber 10. The "V" configuration of the reed valves 66 in the present embodiment is preferred because the reed valves 66 extend to either side of the outlet port 72 (FIG. 2). The reed valves 66, when drawn off of the valve seats 78, can have the effect of at least partially blocking the outlet port 72 during the intake stroke (FIG. 4). This decreases the flow rate of gases which can pass the valve openings 74 and the outlet port 72 to the engine intake port 42. The "V" configuration of the reed valves thereby permits the use of longer reed valves 66, which have greater flexibility and operating characteristics, and which will extend substantially to either side of the outlet port 72 when the reed valves 66 are lifted from the valve seats 78, so as not to substantially block the flow of air through the outlet port 72.

The present invention can be manufactured from many suitable materials, as the intake valve assembly 10 is not directly subject to the extreme temperatures within the engine cylinder 20 which the standard intake valve 30 must endure. Aluminum is a presently preferred material, although other materials are also possible. The reed valve members 66 are preferably manufactured from a quality spring steel, which typically will have a thickness of between six- and eight- 1000ths of an inch.

This invention can be embodied in other specific forms without departing from the spirit or essential attributes thereof, and accordingly, reference should be had to the following claims, rather than to the foregoing specification, as indicating the scope of the invention.

We claim:

1. An attachable intake valve assembly for an engine having an engine intake port, comprising:
   a valve chamber having at least one inlet port, at least one outlet port and a flow passage between the inlet port and the outlet port, said inlet port and said outlet port each having radial boundaries;
   valve means disposed in the flow passage and adapted to permit gas flow from the inlet port to the outlet port, and to prevent gas flow from the outlet port to the inlet port, said valve means comprising at least one valve opening substantially offset from said radial boundaries of said inlet port and said outlet port; and,
   means for attaching the valve chamber to the engine with the outlet port in fluid communication with the engine intake port, whereby said valve will permit gas flow into the engine intake port, and will substantially prevent engine backflow out of engine intake port, and whereby poor engine performance caused by the intake valve will be improved.

2. The intake valve assembly of claim 1, wherein said valve means comprises a reed valve member.

3. The intake valve assembly of claim 2, wherein said at least one reed valve member is mounted to a valve plate disposed in said flow passage, said valve plate having at least one valve opening to permit gas flow through said valve plate, the reed valve member being disposed to substantially cover said valve opening, said reed valve member having a closed position blocking gas flow through said valve opening, and an open position permitting gas flow through said opening, said reed valve member being disposed on a side of said reed valve plate most adjacent said outlet port.

4. The intake valve assembly of claim 3, wherein said reed valve member is disposed on said reed valve plate such that when it is in the "open" position, distanced from the valve opening, the reed valve members do not substantially block gas flow through the outlet port.

5. The intake valve assembly of claim 4, wherein two reed valve members are disposed in a substantially "V" configuration on said reed valve plate, whereby said reed valve members will be directed substantially to either side of said outlet port when in the "open" position, and will not substantially interfere with gas flow through the outlet port.

6. The intake valve assembly of claim 1, wherein said means for attaching said valve chamber to said engine comprises apertures adapted to receive a bolt.

7. The intake valve assembly of claim 1, wherein said valve chamber comprises a plurality of juxtaposed plates, including an inlet port plate, an inlet chamber plate, a valve plate, an outlet chamber plate and an outlet port plate, said plates having openings formed therein to provide said inlet port, inlet chamber, valve openings, outlet chamber and outlet ports, said plates being juxtaposed and fastened together by suitable fastening means.

8. An engine having an engine block with at least one intake valve and at least one intake port, said engine further comprising an intake valve assembly adapted to improve the performance of said engine, said intake valve assembly comprising:
   a valve chamber having at least one inlet port, at least one outlet port and a flow passage between the inlet port and the outlet port, said inlet port and said outlet port each having radial boundaries;
   a valve means disposed in the flow passage and adapted to permit gas flow from the inlet port to the outlet port, and to prevent gas flow from the outlet port to the inlet port; and,
   means for attaching the valve chamber to the engine with the outlet port in fluid communication with the engine intake port, said valve means having at least one valve opening substantially offset from said radial boundaries of said inlet port and said outlet port, whereby said inlet valve assembly will permit gas flow into the engine intake port, and will substantially prevent engine backflow out of the engine intake port, such that poor engine performance associated with the intake valve will be improved.

9. The intake valve assembly of claim 8, wherein said valve means comprises a reed valve member.

10. The intake valve assembly of claim 9, wherein said at least one reed valve member is mounted to a valve plate disposed in said flow passage, said valve plate having at least one valve opening to permit gas flow through said valve plate, the reed valve member being disposed to substantially cover said valve opening, said reed valve member having a closed position blocking gas flow through said valve opening, and an open position permitting gas flow through said opening, said reed valve member being disposed on a side of said reed valve plate most adjacent said outlet port.

11. The intake valve assembly of claim 10, wherein said reed member valve is disposed on said reed valve plate such that when it is in the "open" position, distanced from the valve opening, the reed valve member does not substantially block the gas flow path through the outlet port.

12. The intake valve assembly of claim 11, wherein two reed valve members are disposed in a substantially "v" configuration on said reed valve plate, whereby said reed valve members will be disposed substantially at either side of said outlet port when in the "open" position and will not substantially interfere with gas flow through the outlet port.

13. The intake valve assembly of claim 8, wherein said means for attaching said valve chamber to said engine comprises apertures adapted to receive a bolt.

14. The intake valve assembly of claim 8, wherein said valve chamber comprises a plurality of juxtaposed plates, including an inlet port plate, an inlet chamber plate, a valve plate, an outlet chamber plate and an outlet port plate, said plates having openings formed therein to provide said inlet port, inlet chamber, valve openings, outlet chamber and outlet ports, said plates being juxtaposed and fastened together by suitable fastening means.

15. A method for retrofitting engines to improve the performance of said engines, said engines having at least one engine intake port and an intake manifold means associated with said engine intake port, said method comprising the steps of:

(1) determining the existence of backflow through said engine intake port;
(2) attaching a retrofit intake valve assembly between said intake manifold means and said engine intake port, said intake valve assembly comprising a valve housing having at least one inlet port, at least one outlet port, and a flow passage between the inlet port and the outlet port, a valve being disposed in the flow passage and adapted to permit gas flow from the inlet port to the outlet port, and to prevent gas flow from the outlet port to the inlet port, whereby said valve will permit gas flow into the engine intake port, and will substantially prevent engine backflow out of the engine intake port, and whereby poor engine performance associated with the intake valve of the engine will be improved.

16. The method of claim 15, further comprising the step of fastening together of plurality of juxtaposed plates, said plates having openings formed therein to provide said inlet port, valve openings, and outlet port, said plates being juxtaposed and fastened together by suitable fastening means.

17. The method of claim 16, wherein said fastening step comprises the step of aligning said plates and placing a bolt through the line fastening apertures formed in said plates.

* * * * *